Sept. 26, 1961  L. E. LOGAN  3,001,798
VEHICLE SUSPENSION SYSTEM HAVING INTERCONNECTED ROCKING AXLES
Filed June 17, 1960  2 Sheets-Sheet 1
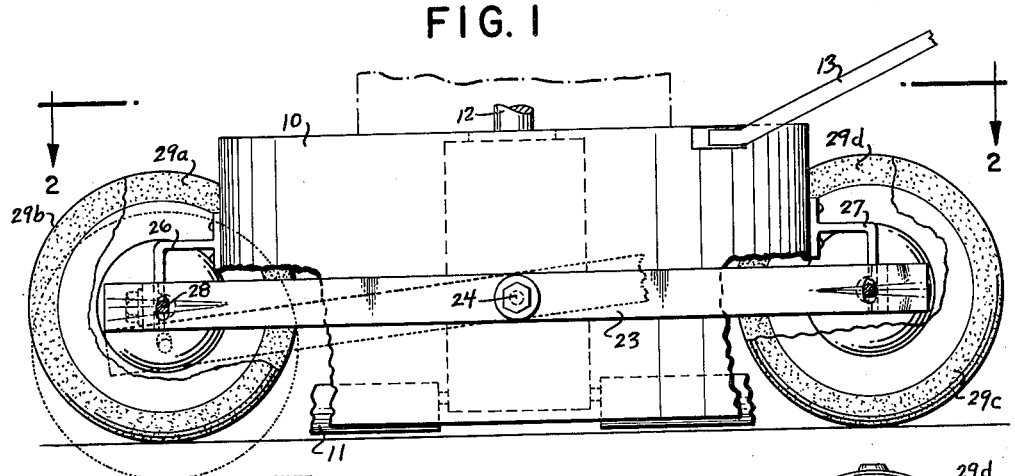
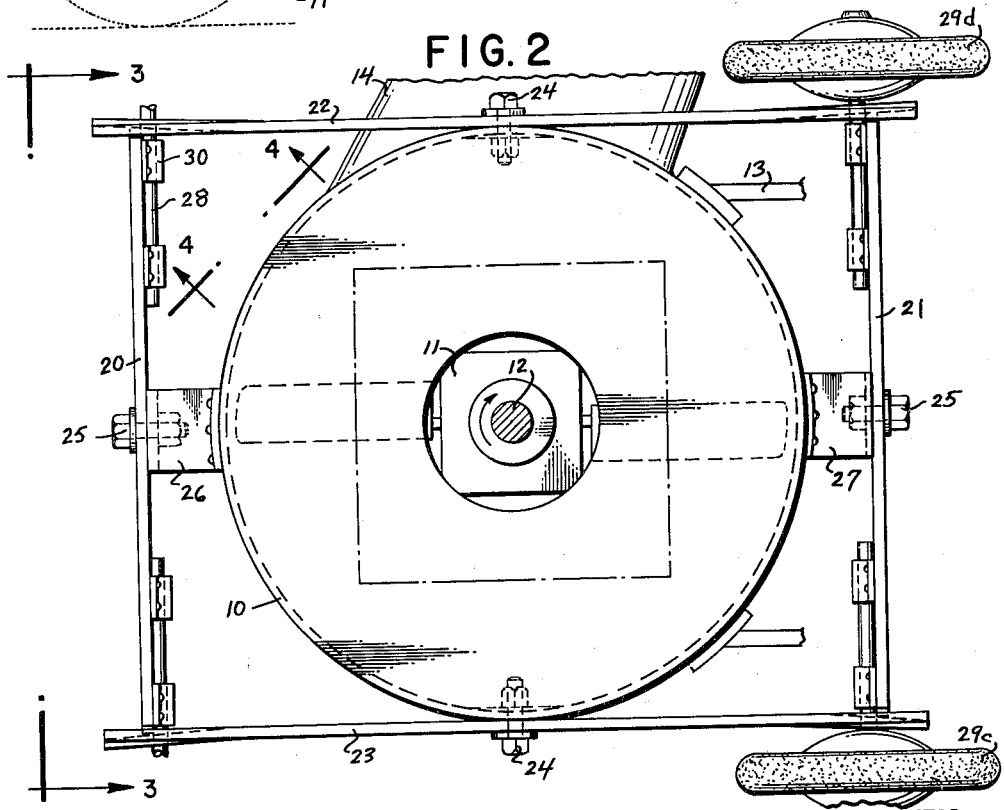
INVENTOR.
LAURENCE E. LOGAN
BY Barnes & Seed
ATTORNEYS

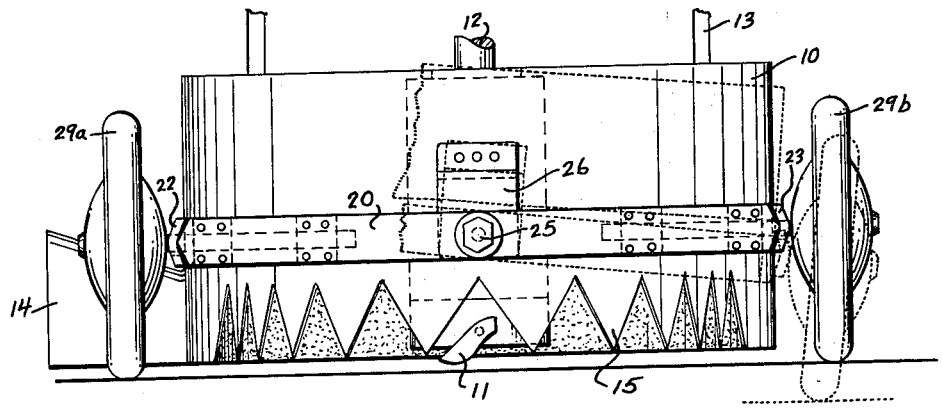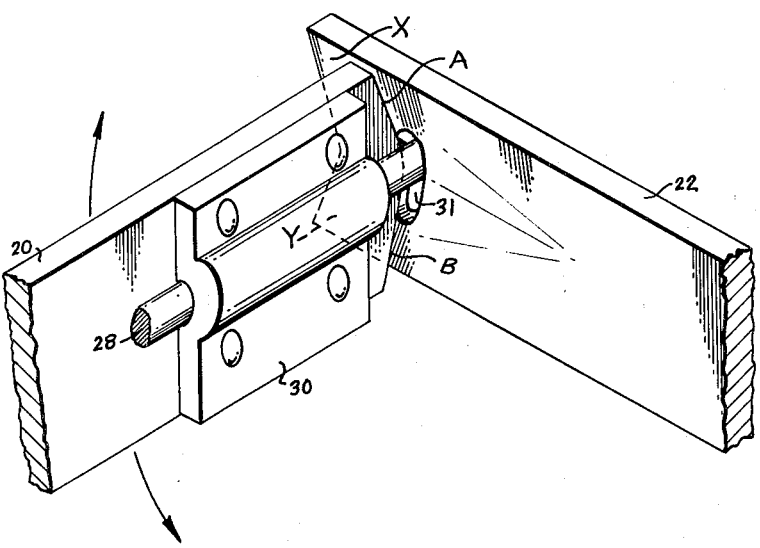

United States Patent Office 3,001,798
Patented Sept. 26, 1961

3,001,798
VEHICLE SUSPENSION SYSTEM HAVING INTERCONNECTED ROCKING AXLES
Laurence E. Logan, 7034 122nd Ave. NE.,
Kirkland, Wash.
Filed June 17, 1960, Ser. No. 36,917
3 Claims. (Cl. 280—104)

The present invention relates to a suspension system for four-wheeled vehicles, and more particularly to a system for averaging without the use of springs, the rise and fall of the wheels as the vehicle travels over an uneven surface.

The invention aims to provide such an averaging system which is of unusually simple and economical construction and which can be readily incorporated in a great variety of mobile objects.

With yet additional objects and advantages in view which, with the foregoing, will appear and be understood in the course of the following description and claims, the invention consists in the novel construction and in the adaptation and combination of parts hereinafter described and claimed.

In the accompanying drawings:

FIG. 1 is a side elevational view of my invention applied to a power lawn mower shown fragmentarily.

FIG. 2 is a top plan view taken as indicated by line 2—2 of FIG. 1;

FIG. 3 is a front elevational view taken as shown by line 3—3 of FIG. 2; and

FIG. 4 is a detail perspective view taken as indicated by line 4—4 of FIG. 2.

Referring to the drawings it is seen that for purposes of example I have illustrated my invention as the suspension system for a rotary lawn mower having a generally cylindrical frame or housing 10 for a cutting blade assembly 11 which depends by a drive shaft 12 through the top of the housing from a suitable motor mounted thereon. A steering handle 13 is provided at the rear of the housing and at one side the housing has a discharge chute 14. As seen in FIG. 3, the front lower edge of the housing may be serrated at 15 for the entry of tall grass.

Continuing to the suspension system, such comprises front and rear like axles 20—21 coacting with a pair of side rails 22—23 all of which may be fabricated from flat stock. The side rails are pivoted at the center to the housing 10 by respective side bolts 24 which define a transverse horizontal swing axis. Similarly, alined bolts 25 pivotally mount the axles 20—21 at the front and rear, the housing providing a pair of brackets 26—27 for receiving these bolts.

It will be noted that the axles each present a pair of laterally projecting stub shafts 28 for carrying wheels 29a–d. These stub shafts are clamped in position by respective pairs of riveted blocks 30 and pass through vertically elongated openings 31 near the ends of the respective side rails 22—23. As best viewed in FIG. 4, in the regions of these openings 31 the side rails are deformed to a generally dihedral vertical cross-section presenting upper and lower inner concave faces X—Y intersecting at an obtuse angle. These dihedral faces are opposed by beveled terminal faces A—B formed at the ends of the axles 20—21. Of importance to note is that the included angle of the axle faces A—B is less than the dihedral angle of the side rail faces X—Y, and the openings 31 are longer than the diameter of the stub shafts 28 so that relative movement can occur between the axles and side rails as indicated by the arrows in FIG. 4.

Aid in understanding the significance of this relative movement is given by reference to the broken line positions in FIGURES 1 and 3. From the first of these it can be visualized that as a front wheel drops into a ground depression, the corresponding side rail can pivot around its center bolt 24. Similarly, from FIG. 3 it can be seen that the front axle 20 can swing about its center pivot bolt 25 responsive to such a front wheel drop. Assume for a concrete example that as the mower is traveling along, the right front wheel 29a engages a mound and the left front wheel 29b drops into a corresponding depression. The effect on the front axle 20 will be the broken line position of FIG. 3. However, the frame 10 will tilt to the left relative to the horizontal only one-half said tilt of the front axle and this tilt of the frame will occur throughout its length. In other words the back end of the frame 10 will be tilted to the left relative to the level rear axle 21 and the front end of the frame will be tilted a like amount to the right relative to the left-tilted front axle 20.

As a further example, assume that the left front wheel 29b drops into a depression while the other wheels remain level. In such a case the right side rail 22 and the rear axle 21 remain level while the left rail 23 swings downwardly at the front and the front axle 20 pivots downwardly to the left. At the same time the frame 10 takes on a tilt in both the fore-and-aft and lateral directions. In the first of these directions the frame tilt is downwardly at the front one-half the tilt of the left rail 23 while in the lateral direction the frame tilt is downwardly to the left one-half the tilt of the front axle 20. It will be appreciated that without my suspension system the frame 10 would be unstable about a diagonal between the right front and left rear wheels in such a situation as that just posed.

Thus it is seen that rises and falls in the ground surface will result in far less tilting of the frame 10 and cutting blade 11 than would be dictated thereto by a conventional wheel mounting arrangement.

As before mentioned, the angle included by the axle terminal faces A—B is less than the dihedral angle defined by the rail faces X—Y. It will be appreciated that sufficient tilt of an axle relative to the side rails will cause one of the axle terminal faces to engage the respective rail face as a stop and thereby limit the averaging action aforedescribed to maintain suspension to frame stability. In this regard, said angles are so set that this stop action only occurs in instances of unusual ground deformity.

Other more particular objects and advantages will, together with these general objects, appear and be understood in the course of the following description and claims, the invention consisting in the novel construction and in the adaptation and combination of parts hereinafter described and claimed.

What I claim is:

1. In a vehicle, a frame, a pair of side rails pivotally connected to said frame at opposite sides thereof for individual swinging movement relative to the frame about a common transverse axis, said side rails each presenting a respective vertically elongated opening adjacent each of its ends and each having respective generally V-shaped inner face portions in the areas surrounding said elongated openings, front and back axle assemblies pivotally connected to said frame at the front and back thereof for individual swinging movement relative to the frame about a common fore-and-aft axis, said axle assemblies having end faces shaped to coact with said generally V-shaped inner face portions of the side rails and to permit limited swinging movements of said side rails and axles assemblies relative to one another, and said axle assemblies having terminal shaft portions projecting from said end faces laterally of said side rails through respective of said vertically elongated openings therein, and wheels carried by said shaft portions.

2. In a vehicle, a frame, a pair of side rails pivotally connected to said frame at opposite sides thereof for individual swinging movement relative to the frame about a common transverse axis, front and back axles pivotally connected to said frame at the front and back thereof for individual swinging movement relative to the frame about a common fore-and-aft axis, the ends of said axles being formed with vertically beveled noses which engage said side rails to permit limited swinging movements of said side rails and axle assemblies relative to one another, and stub shafts on said axles and projecting laterally from said noses through respective vertically elongated openings in said side rails, and wheels carried by said stub shafts.

3. In a vehicle, a frame, a pair of side rails pivotally connected to said frame at opposite sides thereof for individual swinging movement relative to the frame about a common transverse axis, said side rails each presenting a respective vertically elongated opening adjacent each of its ends, front and back axles pivotally connected to said frame at the front and back thereof for individual swinging movement relative to the frame about a common fore-and-aft axis, the ends of said axles being formed with vertically beveled noses which engage said side rails adjacent said elongated openings therein and said side rails being so shaped in the areas of said engagement of said noses therewith as to permit limited swinging movements of said side rails and axles relative to one another, stub shafts on said axles and projecting laterally from said noses thereof through respective said vertically elongated openings in the side rails, and wheels carried by said stub shafts.

References Cited in the file of this patent

UNITED STATES PATENTS

| | | |
|---|---|---|
| 812,037 | Hanson | Feb. 6, 1906 |
| 2,710,199 | Nickles | June 7, 1955 |
| 2,931,156 | Fulwider | Apr. 5, 1960 |